United States Patent [19]

Wilkes

[11] 3,960,247

[45] June 1, 1976

[54] MOTION DAMPER

[75] Inventor: Donald F. Wilkes, Albuquerque, N. Mex.

[73] Assignee: Hosmer/Dorrance Corporation, Campbell, Calif.

[22] Filed: June 20, 1975

[21] Appl. No.: 588,626

[52] U.S. Cl. .................................. 188/1 B; 188/80
[51] Int. Cl.² .......................................... F16F 7/06
[58] Field of Search .............. 188/1 B, 1 R, 80, 130

[56] References Cited
UNITED STATES PATENTS

| 1,990,978 | 2/1935 | Child | 188/1 B UX |
| 3,362,504 | 1/1968 | Maldarelli | 188/1 B |
| 3,503,476 | 3/1970 | Burch et al. | 188/1 B X |

Primary Examiner—Duane A. Reger
Attorney, Agent, or Firm—Burns, Doane, Swecker & Mathis

[57] ABSTRACT

A damping apparatus for retarding motion of a movable body is disclosed. The apparatus has a damper unit with at least two rollers having resilient peripheral surfaces. The rollers are free wheeling relative to one another and roll along a guide in contact with opposite guide surfaces. The damper unit further includes a carrier rotatably carrying the rollers. The carrier is operably connectable to the movable body such that a force is applied to the carrier in response to motion of the body to urge the rollers against the guide surfaces at an intensity which progresses in relation to the magnitude of the applied force to resiliently compress the resilient peripheral surfaces against the guide surfaces as the rollers rotationally travel therealong, to retard motion of the body.

26 Claims, 22 Drawing Figures

MOTION DAMPER

BACKGROUND OF THE INVENTION

The present invention relates to damper apparatus for retarding motion of a movable body.

Energy absorbers, or motion dampers, of many different types have been proposed to retard travel of a movable body. For example, piston-cylinder arrangements are common in which piston movement is retarded by restricting the flow of fluid between front and rear ends of the piston. Dampers of this type usually involve close fits and tight tolerances and require fluid seals which are subject to leakage and wear. Moreover, during damping actions, energy is converted into heat which changes the viscosity of the fluid and thereby alters the damping characteristics of the apparatus. In addition, extreme cleanliness is required in order to prevent blockage of the fluid-conducting passages. In cases where a compressible fluid is utilized as the damping medium, the overall system stiffness changes during a piston stroke, thus altering the damping characteristics.

Another type of energy absorber functions by converting frictional sliding between loaded surfaces into heat. Automobile brakes are representative of this type of energy absorber. Devices of this nature are subject to rapid wear. The damping forces that are generated are proportional to the forces applied in a direction perpendicular to the sliding surface, and nearly twice the amount of force is required to initiate motion than to sustain motion. Another characteristic is that the friction force is independent of the velocity of the body being damped.

Also known are dampers often referred to as visco elastic or elastomeric energy absorbers. These devices dissipate energy by distorting semi-rigid rubber or plastic-like materials. An example of such a device is a rolamite damper described in Research Report No. SC-RR-67-656 entitled "Rolamite: A New Mechanical Design Concept" by the present inventor printed in October, 1967, at pp. 152–4 (report issued by Sandia Corp. of Albuquerque, New Mexico and available from Clearinghouse for Federal Scientific and Technical Information, National Bureau of Standards, U.S. Department of Commerce, Springfield, Virginia). In such a damper, a rolamite band includes a thin visco elastic layer sandwiched between a pair of metal sections. The elastic layer is subjected to shearing action to dampen forces.

Another type of visco elastic damper operates through controlled distortion of the cross section of an elastic layer. In one known embodiment of this principle, an elastic tube slides within a cage having a series of balls. Advancement of the tube through the cage causes the balls to travel down a cam surface into engagement with the tube. In this position the balls rotate in place and compress the tube to retard tube advancement.

Visco elastic dampers of the above-described types are less expensive and are less subject to dramatic failure than other commonly used kinds of dampers. On the other hand, if such dampers are stopped for substantial periods in mid-stroke, the elastic may be subject to creep-induced deformations. These visco elastic dampers are also affected by temperature in that they offer less damping as temperature increases. Heat generated internally by such dampers is poorly dissipated because good visco elastic materials are poor thermal conductors. Also, it would seem that these types of visco elastic dampers exhibit an upper limit of the amount of damping they can provide.

It is apparent that dampers heretofore known have provided useful and advantageous service but exhibit certain disadvantages which limit the extent of their usefulness.

SUMMARY OF THE INVENTION

It is, therefore, an object of the invention to provide such a damper which operates smoothly and evenly even at low velocities and which is not subject to cold flow deformations when idle.

Another object of the invention is to provide a damper whose performance is not significantly affected by temperature fluctuations and which does not exhibit appreciable abrasive wear.

Yet another object of the invention is to provide such a damper whose damping action increases progressively with increases in velocity of the body being dampened and which dissipates heat rapidly.

These objects are accomplished by the present invention which involves a motion damping system comprising a movable body whose motion is to be damped, a guide surface arrangement, and a damper roller arrangement. The guide surface arrangement includes a pair of guide surfaces. The damper roller arrangement includes a pair of rollers mounted for free rotation about axes that are in fixed spaced relation to one another. The rollers each have resilient peripheral surfaces. The body is connected to one of the guide surface arrangement and the roller arrangement. Means is provided which is responsive to the application of a motion-inducing force to the body for moving the body relative to the other of the guide surface arrangement and the damper roller arrangement, and simultaneously urging each guide surface and the resilient surface of an associated roller into compressive engagement at an intensity which progresses in relation to the magnitude of said motion-inducing force as the rollers rotatingly engage the guide surfaces, to retard motion of the body.

DESCRIPTION OF THE DRAWINGS

Several preferred embodiments of the invention are illustrated in the accompanying drawings in which.

DETAILED DESCRIPTION OF THE PREFERRED EMBODIMENT OF THE INVENTION

A preferred embodiment of the present invention is depicted in FIGS. 1 through 6. A motion damping unit 10 is seated for movement within a guide housing 12. The guide housing includes a pair of spaced guide surfaces 14, 16 defining a runway 17 therebetween. The damping unit 10 includes a roller cluster comprising a pair of rollers 18, 20 which are each journalled for independent rotation on a carrier 22. That is, the roller 18 is journalled on a bearing axis 24 and the roller 20 is journalled in a bearing axis 26, these axes being located on a journal section 27 of the carrier 22. The carrier is formed of a relatively rigid material to locate and hold the axes 24, 26 at a fixed distance from one another. Also, the carrier may be vertically or horizontally disposed, or disposed at an angle relative to horizontal and vertical. For purposes of the present discussion, the carrier will be deemed to be vertically disposed.

Figure 2:
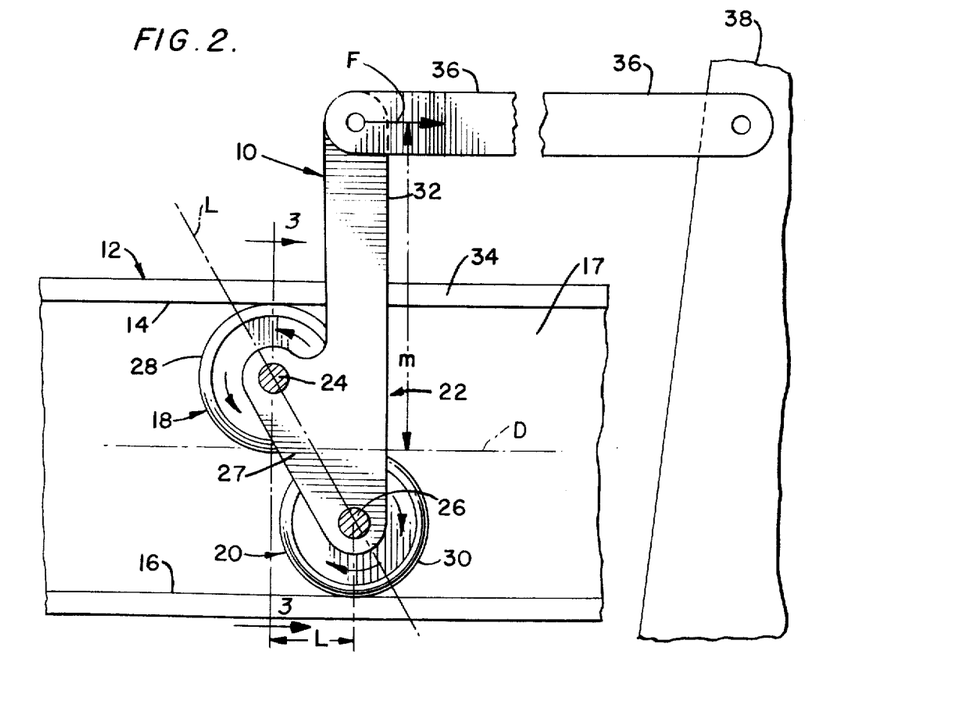
FIG. 2 is a cross-sectional view of the damper unit positioned within a guide housing.

The rollers 18, 20 include resilient peripheral surfaces 28, 30 arranged to respectively contact the guide surfaces 14, 16. The carrier 22 includes a connector end section 32 which projects outwardly from the guide housing through a longitudinal slot 34 and which may be suitably connected by an arm 36 to a body 38 whose motion is to be dampened (FIG. 2). Such a body could constitute a swinging or sliding drawer, for example.

Figure 1:
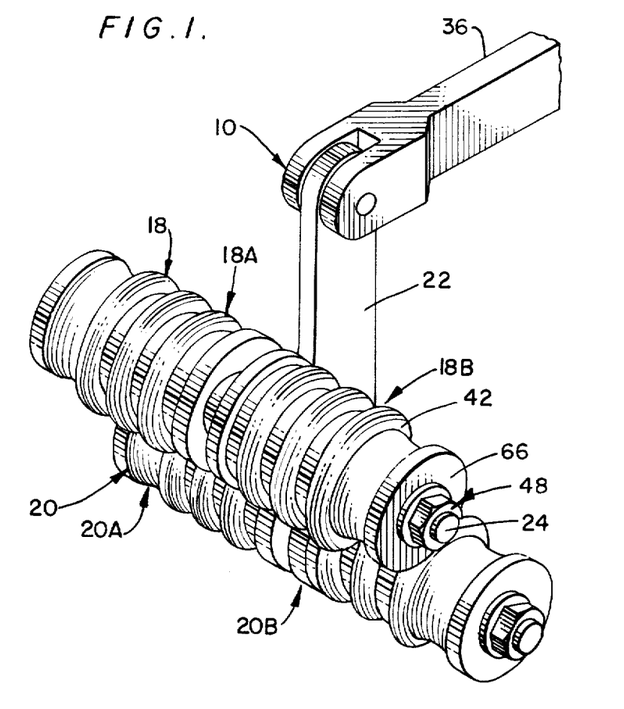
FIG. 1 is a perspective view of a damper unit in accordance with the present invention.
Figure 3:
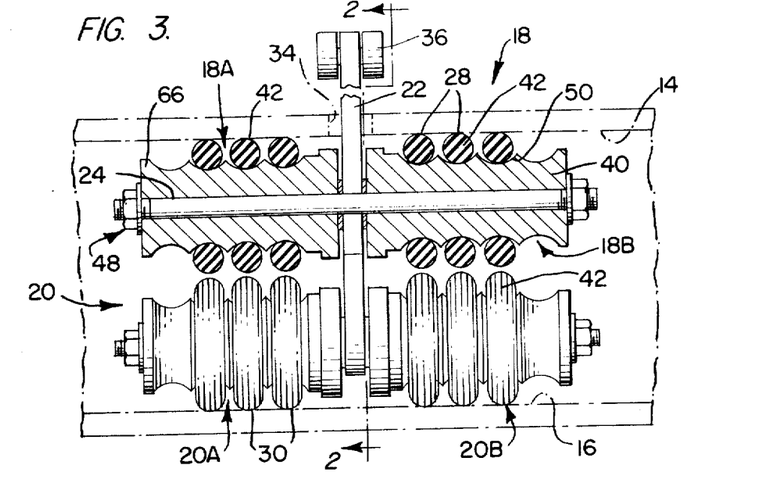
FIG. 3 is a cross-sectional view of the damper unit taken along line 3—3 of FIG. 2.
Figure 4:
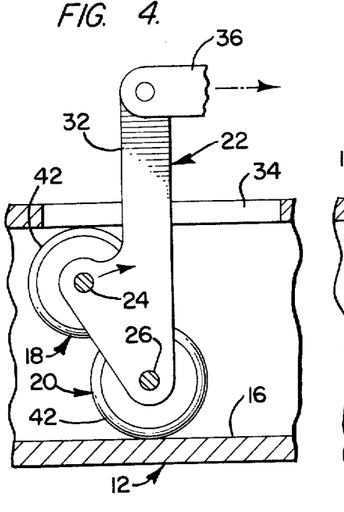
FIGS. 4, 5, and 6 are cross-sectional views of the damper unit as in FIG. 2, but depicting various stages of operation of the damper unit.

The upper and lower rollers 18 and 20 each comprise a pair of roller sections 18A, 18B and 20A, 20B disposed on opposite sides of the carrier 22. The roller sections are journalled on axles 24 and 26.

These axles 24 and 26 are offset such that a reference line L intersecting these axles extends non-parallel and non-perpendicular relative to the guide surfaces.

Each roller section comprises a base portion 40 and a plurality of resilient O-rings 42 carried thereby. The rings may comprise rubber or suitable soft plastics, for example. The body portion 40 carries a roller shaft 44 which is journalled within a bearing aperture 46 of the carrier 22. The outer ends of the roller shaft carry nut and washer assemblies 48 to secure the roller sections 18A, B; 20A, B on the shaft 44. Between axially outer ends of each roller section are situated one or more ring grooves 50 which tightly, elastically receive the rings 42. Once mounted in the grooves 50, the rings 42 have an outer diameter greater than that of the body portion 40 so that the resilient outer periphery of each roller is defined by the rings 42.

During compressive engagement with a guide surface, the O-rings 42 are compressed within the grooves 50. The root radii of the grooves 50 are sized so that the O-rings do not completely fill the grooves before a point of maximum allowed compression is reached. Otherwise, the O-rings could be pressed over the edges of the grooves where they would be subject to being cut and might tend to migrate longitudinally along the roller. Rather, in the over-sized grooves 50 of the present invention, the O-rings 42 will tend to seek a central location which represents a minimum energy state for the loaded system.

The rollers 18, 20 are free wheeling relative to one another. That is, the rollers do not contact one another, nor is any substantial torque transmitted therebetween. Thus, each roller is capable of establishing its own rotational behavior independently of the other as the damper unit 10 travels within the guide housing 12.

Figure 7:
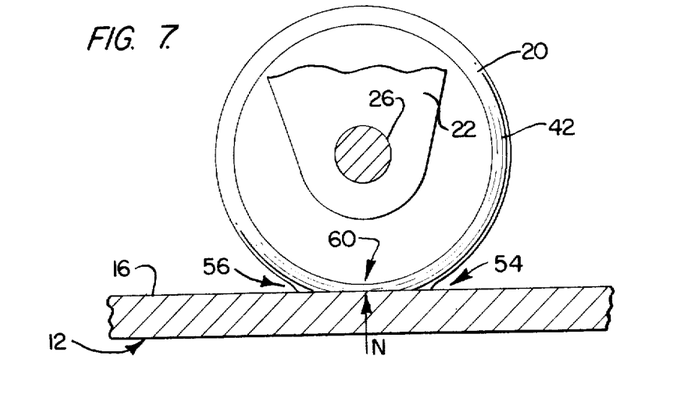
FIG. 7 is an enlarged view of a portion of FIG. 6 showing a roller of the damper unit in a compressed state against a guide surface.

In FIG. 7, there is depicted a condition wherein a roller section 20B has been urged against the guide surface 16 so as to compress the resilient rings 42 of this roller section. This causes some of the resilient material to be forced outwardly ahead of and behind the roller at 54, 56. Consequently, the portion of the ring acted upon by the normal load N producing the compression becomes necked-down to form a restriction 60 which is of an area smaller than the unloaded portions of the ring. This restriction 60 tends to resist the internal flow of resilient material therethrough. Such internal flow must occur during forward rolling movement of the roller section since high frictional forces between the ring 42 and the guide surface 16 prevent the occurrence of any appreciable slippage therebetween in the region where the ring 42 contacts the guide surface. In the unloaded regions, however, such relative slippage does occur.

Therefore, as the roller section 20B advances, and the rollers rotate in tight frictional engagement with the surfaces 14, 16, the resilient material 54 ahead of the restricted zone 60 must pass through the restricted zone in the form of an internal viscous flow. Such a situation is analogous to fluid flow through a restricted orifice. As the flow of resilient material passes through the restricted zone, its velocity increases. This increased velocity is resisted by the frictional forces tending to prevent relative movement between the ring 42 and the guide surface 16. These actions serve to establish a great resistance to rolling and thus tend to dampen the motion of the body 38 connected to the link 22. It has been found that the magnitude of the damping forces being produced is related to the velocity of the rollers. That is, a greater rolling velocity produces increased damping effects.

An important feature of the damper unit is the ability of the O-rings to rapidly dispel any deformations which may develop. For example, in the event that the O-rings are disposed in a rest condition for a prolonged period, a flattened or depressed region might be formed in the O-rings in the locale where the O-rings contact a guide surface. Subsequent operation of the damper unit will compress the O-rings against the guide surfaces (FIG. 7) to a condition wherein the O-ring material is expressed outwardly ahead of and behind the O-ring as at 54, 56, and the compressed area forms a restriction. During rolling of the rollers, no slippage occurs between either the O-ring and the roller body section or between the O-ring and the guide surface in the loaded region. Elsewhere, however, slippage between the O-ring and body section does occur. The result is a circumferential stretching and working of the O-ring which tends to rapidly smooth out these depressions or other irregularities that may be present. In fact, the irregularities will actually be relocated relative to the base portion 40. This is important since it means that when the damper unit is returned to its rest position, a different section of the O-rings will contact the guide surfaces. Thus, the formation of a permanent irregularity is highly unlikely. Such relocation of irregularities will vary in adjacent O-rings due to slight differences in size and degree of loading of the O-rings. Consequently, irregularities in adjacent O-rings change their relative positions to provide a further smoothing effect.

As will be discussed subsequently in greater detail, the force being applied to the damper unit by the body being damped are applied in such a manner that the normal loading between the O-rings and the guide surfaces is a function of this applied force. That is, as the applied force increases, there is a greater compression of the rollers which serves to further increase the damping effects.

It is desirable that the maximum possible amount of ring compression be limited, to assure that the resilient material thereof can recover elastically, i.e., is not plastically deformed. To accomplish this, the roller body 40 can be provided with a stop flange 66 such that engagement between the guide surfaces and roller body occurs before plastic deformation of the rings 42 occur. Alternatively, the flange could be located on the carrier 22 for contacting a guide surface.

It is preferred to fabricate the roller body 40 of Teflon or some other self-lubricating material, such as an oilite bronze composition. This assures that only minimal wear will result from the sliding movement between the rings 42 and the roller body 40 which occurs in the unloaded regions during damping movement. To achieve this result, the rings 42 are preferably held onto the roller body by a tight elastic fit, rather than being bonded or keyed thereto.

The rings 42 are preferably of circular cross-section. However, other cross-sections such as elliptical or triangular configurations may be employed to vary the damping characteristics obtained.

OPERATION

It will be appreciated that when the damper unit 10 according to the embodiment of the invention disclosed in conjunction with FIGS. 1–6 is in an unloaded condition (FIG. 4), there are no substantial normal loads being imposed on the rollers which would cause significant compression of the resilient surfaces (considering the weight of the damper unit to be negligible).

As motion-inducing forces are applied to the body 38, actuation force F is transmitted to tahe carrier 22. The carrier, in response thereto, swings, or pulls-in, in a manner wedging the rollers against the guide surfaces 14, 16, thereby compressing the rings 42 against the guide surfaces at an intensity which is in accordance with the magnitude of the force F. The damper unit then begins to travel within the runway 17, with the rollers being in rolling, compressed contact with the guide surfaces 14, 16. This initial compression of the rings 42 and pull-in of the carrier 22 during the initial application of force F to the damper unit 10 provides a shock absorbing action whereby the force F is only gradually applied to the rollers. As a result, the overall operation of the damping unit 10 will be rather smoother and more even than the changes which occur in the applied force.

As the forces being imposed upon the body 38 are increased, as might tend to increase the velocity of body 38, the actuating force F acting upon the carrier 22 also increases. As a result, the carrier 22 further swings and further compresses the rings 42 against their respective guide surfaces to increase the motion-retarding forces with an intensity that progresses in relation to the magnitude of the applied force F. Since this occurs in a gradual fashion before the velocity of the damper unit 10 increases, it is apparent that once again a shock-absorbing pull-in effect has taken place. It has been found that in accordance with the invention, once the gradual pull-in action has occurred, the urging of the rollers against the guide surfaces may occur at an intensity which is almost directly proportional to the forces being applied to the carrier.

Figures 5, 6:
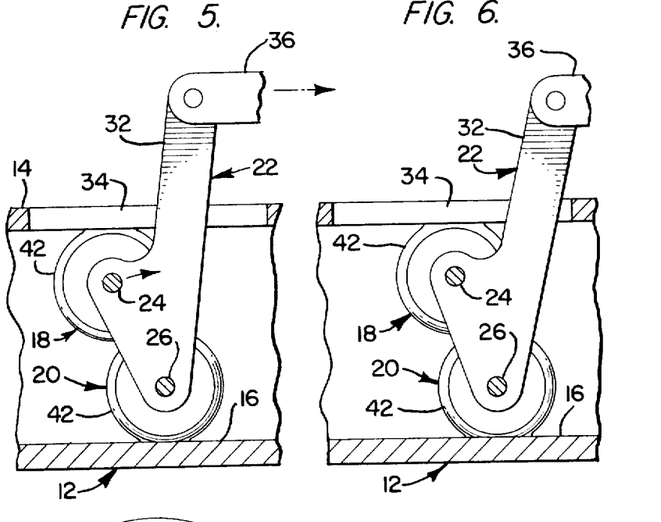

When it is desired to return the body 38 to its initial position, forces are applied to the carrier 22 in a direction opposite to the direction of advancement shown in FIG. 5. As a result, the rollers 18, 20 are swung away from substantial compressive engagement with the guide surfaces 14, 16, and a relatively free roll of the damper unit 10 is provided to permit an unresisted return of the body 38. As will be discussed subsequently, the present invention can be embraced by embodiments thereof which provide damping effects in both directions of movement.

It may be desirable in some instances to provide the damper unit with a slight preload or pre-drag force. Such a preloading aids in initiating damper behavior. In the embodiment of FIG. 1, this preloading can be accomplished, for example, by a spring operably disposed between the carrier 22 and the arm 36 to impart a slight torque to the carrier in a direction tending to wedge the rollers against the guide surfaces.

Among the characteristics which have been found to influence performance of the damper system is a characteristic that may be termed the amplification factor. This amplification factor is the ratio between the effective moment arm M and the spacing L between the roller centers (FIG. 2). In practice, it has been found that the greater the amplification factor, the greater the dampening force. In the case of the embodiment depicted in FIGS. 1 and 2, the amplification factor will increase with increasing force F since the length L will gradually decrease as the carrier 22 turns within the runway 17. As will be later discussed, arrangements are possible wherein the amplification factor can be made to decrease as the actuation force increases. It will be appreciated that regulation of the amplification factor, i.e., by varying the parameters M and L, the behavior of the damper unit can be adapted to various situations. Other characteristics of the damper unit, i.e., number of O-rings and O-ring size and resiliency just to name a few, can also be varied to regulate the type of performance obtained.

ALTERNATIVE PREFERRED EMBODIMENTS

In FIGS. 8, 9, 10, 11, 13, 14, 15, and 16 embodiments of the present invention are shown wherein more than two rollers are provided. One pair of the rollers are mounted on axes which are spaced in the direction of travel of the damper unit and spaced in a direction transverse to such direction of traavel. That is, a first reference line intersecting the last-named axes extends non-parallel and non-perpendicular relative to the guide surfaces. Another pair of the rollers is mounted on axes such that a second reference line intersects these last-named axes and extends non-parallel and non-perpendicular relative to the guide surfaces. In the embodiment described in accordance with FIGS. 8, 9, 11, 13, 14, and 16, the first and second reference lines intersect one another. In the embodiment disclosed in conjunction with FIGS. 10 and 15, the first and second reference lines are parallel.

Figure 8:
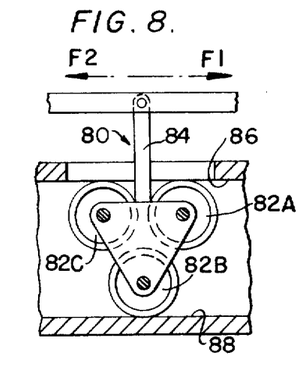
FIGS. 8 through 18 are longitudinal sectional views of alternative embodiments of the invention.

More particularly, FIG. 8 depicts a damper unit 80 disposed between a pair of guide surfaces 86, 88. The damper unit has three rollers 82A, B, C journalled to carrier 84. A line intersecting the axes of rollers 82A, B defines a first reference line. A line intersecting the axes of rollers 82C, B defines a second reference line which intersects the first reference line. Both reference lines lie at an angle other than 90° relative to the direction of travel of the damper unit. That is, they are non-parallel and non-perpendicular relative to the guide surfaces. When a force F1 is applied in one direction, the rollers 82B, 82C are urged into respective contact with the spaced guide surfaces 88, 86. When a force F2 is applied in the opposite direction, the rollers 82B, 82A are urged into contact with the guide surfaces 88, 86. It will thus be apparent that, in contrast to the embodiment of FIGS. 1-6, the damper unit 80 establishes damping forces in both directions of movement.

Figure 9:
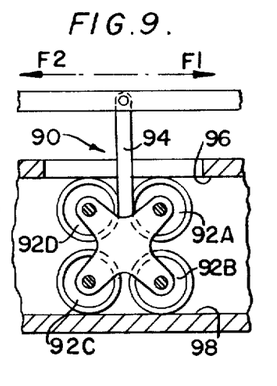

Another embodiment of the invention is depicted in FIG. 9 wherein a damper unit 90 is disposed between a pair of guide surfaces 96, 98. The damper unit 90 has four rollers 92A, B, C, D journalled on a carrier 94 in fixed relationship relative to one another. The axes of rollers 92A, C are intersected by a first reference line, and the rollers 92B, D are intersected by a second reference line which intersects the former. Both reference lines lie at an angle other than 90° relative to the direction of travel of the damper unit. The application of a force F1 to the carrier 94 urges the rollers 92B, D into contact with the guide surfaces 98, 96 to dampen movement in a first direction. When a force F2 is applied to the carrier in an opposite direction, the rollers 92A, C are urged into contact with the guide surfaces 96, 98 to retard movement in such opposite direction.

Figure 10:
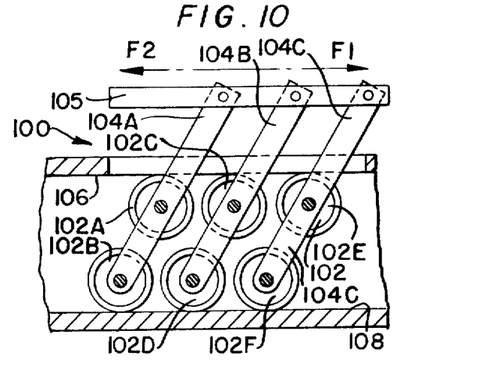

In an embodiment shown in FIG. 10, a damper unit 100 is situated between a pair of guide surfaces 106, 108. The damper unit includes a series of roller pairs 102A-B, C-D, and E-F. Each roller pair is mounted on a carrier link 104A, B, D. Each carrier link is connected pivotally to a common arm 105 such that the application of a force F2 to the arm 105 causes the rollers 102A, C, E to engage the guide surface 106, while causing the rollers 102B, D, F to engage the surface 108. The application of a force F1 in the opposite direction relieves the damping forces and permits a free roll within the guide housing. It will be noted that a reference line intersecting the axes of rollers 102A, B lies parallel to a reference line intersecting the axes of rollers 102C, D.

Figure 11:
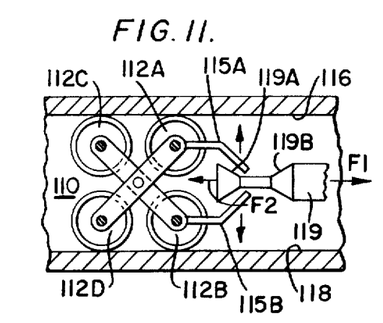

In FIG. 11 an embodiment is shown wherein a damping unit 110 is located between a pair of guide surfaces 116, 118. The damping unit 110 includes four rollers 112A, B, C, D journalled at the ends of a pair of pivotally connected carrier links 114A, B. The links 114A, B are pivotally connected intermediate their ends and are arranged to be operably connected to a cam bar 119 by receiving one end thereof. The other end of the cam bar is operably connected to the body whose motion is to be dampened. The cam bar can include one or two cam faces, but preferably includes two cam faces 119A, B. When a force F1 is applied to the cam bar, the cam face 119A pivots the links 114A, B in a scissoring motion to urge the rollers 112A, C into contact with the guide surface 116 and the rollers 112B, D into contact with the guide surface 118 to retard movement. When a force F2 is applied in the opposite direction, the cam face 119B produces the same action. If desired, there could be utilized only one cam face, depending upon which direction of movement is desired to be dampened.

In the embodiments described in connection with FIGS. 1, 8, 9, 10, and 11, the damper unit has been situated between the guide surfaces. In the embodiments to be discussed in relation to FIGS. 12, 13, 14, 15, and 16, the guide surfaces are situated between the rollers.

Figure 12:
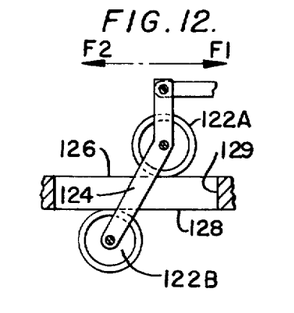

More specifically, in FIG. 12 an embodiment is shown which operates under the principles demonstrated in accordance with the embodiment of FIG. 1. A damper unit 120 has a pair of rollers 122A, B mounted on a carrier 124 for travel on spaced guide surfaces 126, 128. The guide surfaces 126, 128 are disposed intermediate the rollers 122A, B. The carrier 124 passes through a slot 129 which extends through both guide surfaces. It will be apparent that the application of a force F1 will cause the roller 122A to compressively engage the guide surface 126 and simultaneously cause the roller 122B to compressively engage the other guide surface 128. The application of a force F2 in the opposite direction will essentially relieve the compressive damping forces and permit a free roll of the damping unit.

In the embodiment of FIG. 12, preloading of the damper unit could be achieved by locating the axles of the rollers sufficiently close together that a slight compression of the rollers occurs at a rest condition of the system. Such preloading would aid in inducing damping effects, as noted previously.

Figure 13:
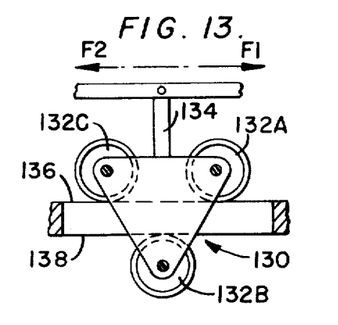

The embodiment depicted in FIG. 13 includes a damper unit 130 which operates under the principles disclosed in connection with the embodiment of FIG. 8. Rollers 132A, B, C are mounted on a carrier 134. Guide surfaces 136, 138 are disposed between rollers 132A, C and 132B. The application of a force F1 causes the rollers 132A, B to compressively engage the guide surfaces 136, 138 while the application of a force F2 in the opposite direction causes the rollers 132C, B to engage the guide surfaces 136, 138.

Figure 14:
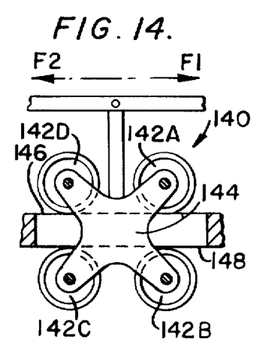

In FIG. 14 an embodiment functioning under the principles set forth in conjunction with the FIG. 9 embodiment is shown. A damper unit 140 includes four rollers 142A, B, C, D journalled to a carrier 144. Guide surfaces 146, 148 are situated between rollers 142A, D and 142B, C. As in the FIG. 9 embodiment, the axes of the four rollers are disposed in fixed relation relative to one another. The application of a force F1 causes the rollers 142A, C to compressively engage the guide surfaces 146, 148 to dampen motion. The application of a force F2 in the opposite direction causes the other two rollers 142B, C to engage the guide surfaces 148, 146 to retard motion in the opposite direction.

Figure 15:
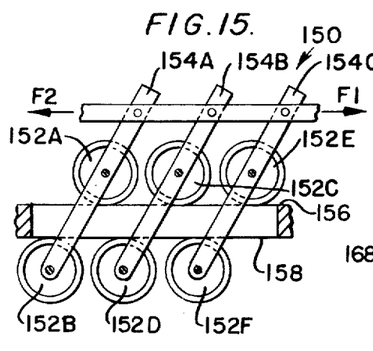

The embodiment depicted in FIG. 15 is a modified form of that shown in FIG. 10. A damper unit 150 includes a carrier comprising a plurality of links 154A, B, C. A series of roller pairs 152A-B, C-D, E-F are mounted on the links 154A, B, C, respectively. Guide surfaces 156, 158 are disposed between the rollers 152A, C, E and 152B, D, F. The application of a force F1 to the carrier urges the rollers 152A, C, D against the guide surfaces 156 and rollers 152B, D, F against the guide surface 158. The application of a force F2 in the opposite direction essentially releases the damping forces, thereby allowing a free roll.

Figure 16:
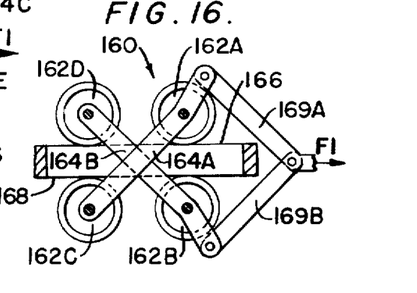

The embodiment shown in FIG. 16 depicts a scissors arrangement of a damper unit 160 for engaging guide surfaces 166, 168 disposed therebetween. The carrier comprises pivoted links 164A, B which carry rollers 162A, B, C, D. A pair of arms 169A, B interconnect the links 164A, B with a body being dampened. The application of a force F1 causes the rollers 162A, C to compressively engage the guide surface 166 and the rollers 162B, D to engage the surface 168. A force applied in the opposite direction relieves the damping action.

As concerns the amplification factor of the systems disclosed in conjunction with FIGS. 12–16 and 19, it will be understood that such factor will diminish with increasing drag forces because the distance between the roller centerlines increases as the rollers are compressed against the guide surfaces. Thus, systems of the type disclosed in FIGS. 12–16 and 19, wherein the guide surfaces are disposed between the rollers, may be desirable for use in instances where a more gradual build-up of damping forces is required, as compared with systems wherein the damper unit is situated between the guide surfaces.

It is noted that the present invention can be adapted to provide varying damping characteristics. For example, the guide housing may be arranged such that the guide surfaces are tapered to gradually approach one another in the direction of travel. In this fashion, the compression of the rollers will increase progressively, whether or not the velocity of the body being dampened increases.

In other instances, it may be desirable to provide guide surfaces whose relative spacing varies at different locations to regulate the damping forces at different stages of travel of the body being dampened.

It may be desirable to position a cam on the carrier which engages the guide housing to prevent significant compression of the rollers until a certain location is reached, whereupon the cam encounters an opening or slot to remove it from engagement with the guide housing.

Figure 18:
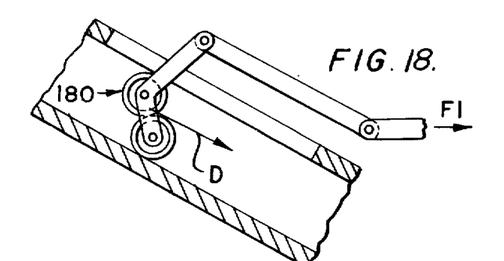

It is noted that it is not necessary for the direction of movement of the body being dampened to be parallel with the direction of movement of the damping unit. As shown in FIG. 18, the force F1 extends at an angle relative to the direction of travel D of the damper unit 180.

Figure 17:
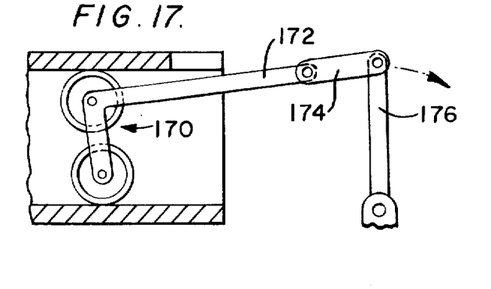

In an alternative embodiment of the invention depicted in FIG. 17, a damper unit 170 is connected by suitable pivoted linkage 172, 174 to dampen movement of a rotatably traveling body 176. Rotation of the body 176 in a clockwise direction of FIG. 17 will be dampened. Counterclockwise movement will, of course, be effected with a free roll.

Figure 19:
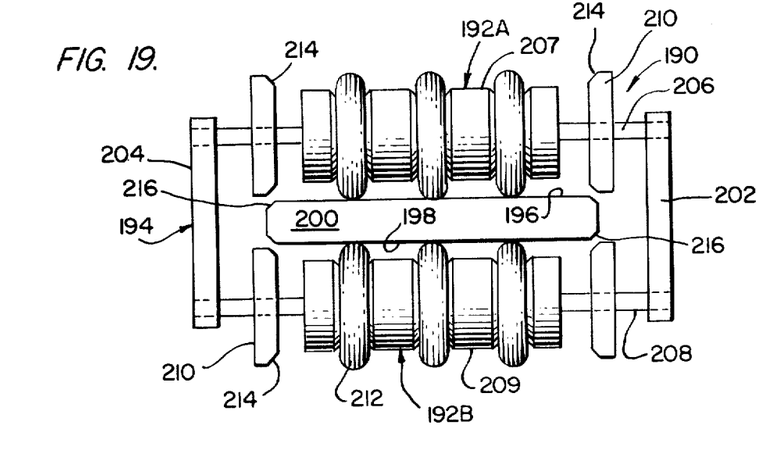
FIG. 19 is a cross-sectional view of another preferred form of the invention.

FIG. 19 depicts a further embodiment of the invention operating under principles discussed in connection with the embodiment depicted in FIG. 12. The damper unit 190 has a pair of rollers 192A, B mounted on a carrier 194. The rollers are arranged for travel on spaced guide surfaces 196, 198 of a guide housing 200. The carrier, rather than passing through a slot as in the embodiment discussed in conjunction with FIG. 12, is of the wrap-around type which includes arms 202, 204. The arms 202, 204 are situated at opposite sides of the guide surfaces 196, 198 and carry rotary axes 206, 208 of the rollers 192A, B. Each axle carries a single roller section 207, 209. Mounted on each axle at opposite sides of each roller section are bottoming flange rolls 210. These flange rolls 210 are situated to rollingly contact the guide surfaces prior to compaction of the O-rings 212 beyond their elastic limit. Preferably, the inner edges 214 of the flange rolls 210 are chamfered, with the outer edges 216 of the guide surface housing 200 being correspondingly chamfered. As a result, mating engagement between the edges 214, 216 produces low Hertzian stresses and non-cutting contact conditions. With the wrap-around type of carrier, each roller can comprise a single roller section, rather than a plurality of sections in the case where a central carrier of the type shown in FIG. 12 is used.

Figure 20:
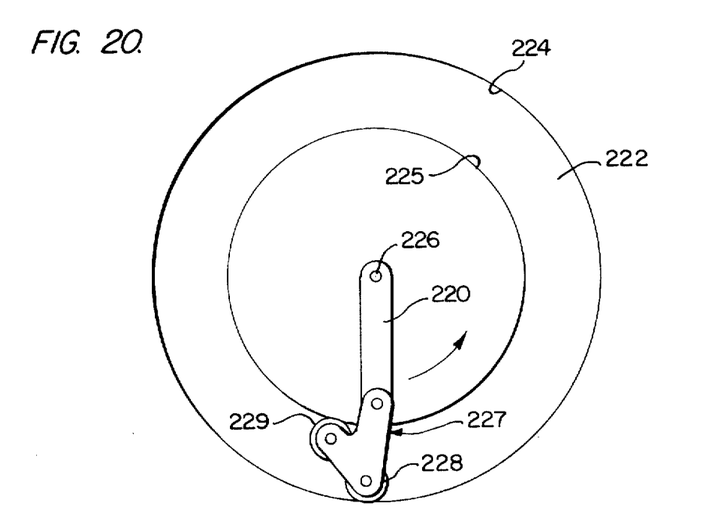
FIG. 20 is a schematic depiction of another preferred arrangement of the present invention.

In FIG. 20 an embodiment of the invention is depicted wherein the rotary movement of a member 220 is to be damped. A runway 222 is formed by circular guide surfaces 224, 225 which are concentric relative to the rotary axis 226 of member 220. A damper unit 227 is mounted for movement in the runway 222 and is connected to the member 220. The damper unit 227 includes a pair of rollers 228, 229 which are pressed against the guide surfaces 224, 225 respectively in response to rotary movement of the member 220, to dampen the movement thereof. It is thus apparent that the present invention is amply suited for use in damping non-linear motion by the use of curved guide surfaces.

Figure 21:
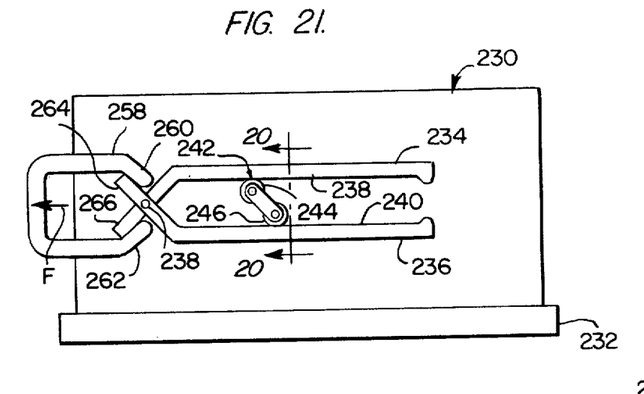
FIG. 21 is a side view of a further preferred embodiment of the present invention.
Figure 22:
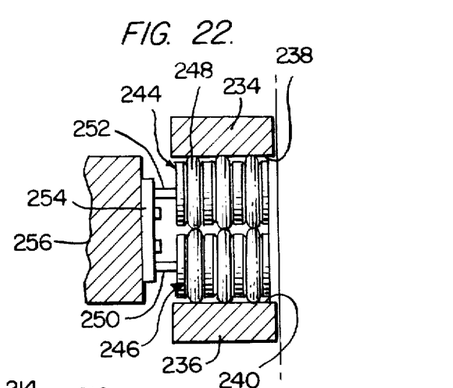
FIG. 22 is an enlarged cross-sectional view taken along line 22—22 of FIG. 21.

The principles of the present invention can be utilized in an arrangement wherein the guide surfaces, rather than the damper unit, are connected to the body whose motion is to be damped. As depicted in FIG. 21, a movable body 230 such as a drawer, for example, is mounted for sliding movement along a pair of suitable guide rails 232 (only one guide rail being shown). Mounted on the body 230 is a guide surface arrangement which includes a pair of guide arms 234, 236. These guide arms are pivoted to the body 230 by a pivot pin 238 for individual pivotal movement. The guide arms 234, 236 include spaced guide surfaces 238, 240 which extend along a side of the body 230. Between the guide surfaces a damper unit 242 is disposed. The damper unit 242 includes a pair of rollers 244, 246 which each carry a plurality of resilient O-rings 248. The rollers are mounted for free rotation about axles 250, 252 which are mounted in fixed spaced relation. These axles 250, 252 are connected to an arm 254 which is rigidly connected to an adjacent frame 256 (FIG. 22). The frame 256 has been removed from FIG. 21 for the sake of clarity.

At the front of the body 230, a handle 258 is provided. The handle is connected to the body 230 by means of a pair of gripper arms 260, 262 which extend inwardly around forward ends 264, 266 of the arms 234, 236. It will be realized that the application of a force F to the handle is transmitted to the body 230 through the arms 234, 236 and the pivot pin 238 to place the body 230 and the guide surfaces in motion relative to the damper unit. Simultaneously, the arms 234, 236 are pivoted in scissors-like fashion such that the guide surfaces 238, 240 are brought into compressive engagement with the rollers 244, 246. In accordance with earlier discussed principles, it will be realized that compression of the O-rings 2248 results in a dampening of the motion of the body 230 as the guide surfaces travel along the rollers 244, 246, with the latter being in rotating engagement therewith. Significantly, as the force F increases, the guide surfaces 238, 240 are compressed against the rollers 244, 246 with an increasing magnitude to further increase the dampening forces. Conveniently, damping arrangements could be provided on both sides of the body 230, with a common handle that activates both damping arrangements.

The embodiment of the invention discussed in accordance with FIGS. 21, 22 provides the important advantages discussed previously. For example, when the force F is relieved, the guide surfaces are relaxed to substantially remove the loading on the rollers. Thus, the formation of depressions in the system is prevented.

The rollers are also self-smoothing, shock resistant, and self-compensating as to wear and thermal expansion.

It will be apparent that the damping unit of the present invention requires no seals. Moreover, the rollers rotate without significant slippage, and thus generate very little wear-producing friction. This assures a longer life for the damper unit.

Upon the imposition of a force to be dampened, the resilient peripheral surface of the rollers are urged into engagement with the guide surfaces. Because of this, there is no need for critical fits or close tolerances since the resilient surfaces will assume a proper condition of compression in accordance with the force being applied. Moreover, this initial compressive action tends to absorb shocks which might otherwise occur if a sudden abrupt commencement of damper travel were required. As the velocity of the body being dampened tends to increase, or other conditions occur which produce increased force on the damper unit, the peripheral surfaces are urged into a higher degree of compression with the guide surfaces to increase the dampening forces. In other words, the normal forces are always a function of the drag force. Consequently, the damping unit automatically adapts to velocity, or force, variations.

Once the applied forces are terminated, the resilient peripheral surfaces automatically return to an essentially uncompressed state. In this fashion, it is assured that permanent deformations will not be created during periods wherein the damper unit is idle. In addition, with certain of the disclosed embodiments, the present invention can be utilized to produce the novel dampening action during a single direction of movement of the damper unit, and allowing a free roll to an initial posture. If desired, the principles of the present invention can be utilized to provide two-way dampening.

The present invention is also highly self-compensating for temperature variations. As temperature increases, the resistance to viscous flow of the roller resilient material through the restricted zone decreases. At the same time, however, the overall stiffness of this resilient material decreases by virtue of the increase in temperature, and thereby results in a greater degree of compression of the roller so as to cause a greater amount of restriction in the restriction zone. Therefore, even though the resilient material becomes less viscous and able to flow more freely through the restriction zone, the restriction zone becomes even smaller and thus compensates for the reduced viscosity.

The combination of self-regulated wedging of the roller duster and the resilient characteristics of the rollers enable the rollers to automatically compensate for wear or thermal expansion of the contacting surfaces.

The self-lubricating features of the roller body material is very effective in absorbing and carrying away localized heat generated in the damping unit. A roller body material composed of oil impregnated bronze (oilite) is very effective in three respects: (1) it minimizes abrasive wear between O-rings and rollers in the non-loaded portion; (2) it minimizes abrasive wear at the rotational axis of the roller; and (3) it is an efficient thermal conductor and can effectively carry away the heat generated by the damping action.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A motion dampening system comprising:
   a movable body whose motion is to be dampened;
   a guide surface arrangement including a pair of guide surfaces;
   a damper roller arrangement including a pair of rollers mounted for free rotation about axes that are in fixed spaced relation to one another, said rollers each having resilient peripheral surfaces;
   said body being connected to one of said guide surface arrangement and said roller arrangement;
   means responsive to the application of a motion-inducing force to said body for moving said body relative to the other of said guide surface arrangement and said roller arrangement, and simultaneously urging each guide surface and the resilient periphery of an associated roller into compressive engagement at an intensity which progresses in relation to the magnitude of said motion-inducing force as said rollers rotatingly engage said guide surfaces, to retard motion of said body.

2. A system according to claaim 1 wherein said roller arrangement is connected to said body.

3. A system according to claim 1 wherein said guide surface arrangement is connected to said body.

4. A motion damper comprising:
   means providing a pair of spaced guide surfaces;
   carrier means;
   at least two rollers journalled independently for rotation on said carrier means about parallel axes, said rollers having resilient peripheral surfaces arranged to engage respective ones of said guide surfaces;
   actuating means for rotating said carrier means in response to the application of force generally along the length of said guide surfaces in one direction;
   said rollers being positioned on said carrier means relative to said guide surfaces such that rotation of said carrier means in response to the application of a force in said one direction urges said peripheral surfaces into contact with said guide surfaces at an intensity which progresses in relation to the magnitude of said applied force, to resiliently compress said resilient peripheral surface means against said guide surfaces as said rollers travel along said guide surfaces in the direction of said force.

5. A dampening apparatus according to claim 4 wherein said axes are spaced such that a reference line intersecting said axes extends non-parallel and non-perpendicular relative to said guide surfaces.

6. A dampening apparatus according to claim 4 wherein said carrier means extends through a longitudinal slot in one of said guide surfaces.

7. A dampening apparatus according to claim 4 wherein said rollers each comprise at least one roller section; each roller section comprising a roller body and at least one resilient ring mounted thereon by an elastic fit, said resilient ring defining said resilient peripheral surface means.

8. A dampening apparatus according to claim 7 wherein each roller comprises a pair of said roller sections disposed on opposite sides of said linkage means.

9. A dampening apparatus according to claim 4 wherein said at least two rollers comprises more than two rollers; one pair of said rollers being mounted on axes such that a first reference line intersecting said axes extends non-parallel and non-perpendicular relative to said guide surfaces; another pair of said rollers being mounted on axes such that a second reference line intersecting said last-named axes extends non-parallel and non-perpendicular relative to said guide surfaces.

10. A dampening apparatus according to claim 9 wherein said first and second reference lines intersect one another.

11. A dampening apparatus according to claim 9 wherein said first and second reference lines are parallel.

12. A dampening apparatus according to claim 10 wherein there are three rollers, one of said rollers being arranged to contact one of said guide surfaces and the other two rollers being arranged to contact the other guide surface.

13. A dampening apparatus according to claim 10 wherein there are four rollers; the rollers whose axes are disposed on said first reference line being arranged to contact respective ones of said guide surfaces; and the rollers whose axes are disposed on said second reference line being arranged to contact respective ones of said guide surfaces.

14. A dampening apparatus according to claim 13 wherein said rollers are located in fixed positions relative to one another.

15. A dampening apparatus according to claim 13 wherein said rollers whose axes are disposed on said first reference line are mounted on a first arm of said carrier means; said rollers whose axes are disposed on said second reference line being mounted on a second arm of said linkage means; said first and second arms being pivotally interconnected intermediate their ends; said carrier means further comprising a cam bar operably connected to said first and second arms such that movement of said cam bar in at least one direction pivots said arms relative to one another to swing all of said rollers into contact with said guide surfaces.

16. A dampening apparatus according to claim 4 wherein said rollers are situated between said guide surfaces.

17. A dampening apparatus according to claim 4 wherein said guide surfaces are situated between said rollers.

18. A dampening apparatus according to claim 4 wherein the direction of movement of said damper unit is in non-parallel relation to the direction of movement of the body being dampened.

19. A dampening apparatus according to claim 4 wherein there are more than two of said rollers; said rollers being arranged to be urged against said guide surface means in two opposed directions of movement of said dampening body.

20. A dampening apparatus according to claim 4 wherein said guide surfaces are curved.

21. A dampening apparatus for retarding the motion of a movable body in at least one direction of motion thereof, said dampening apparatus comprising:
a pair of spaced guide surfaces;
a dampening unit displaceable along said guide surfaces and including:
a plurality of rollers, each having a body portion and a plurality of resilient rings elastically mounted thereon;
said rollers being free wheeling relative to one another;

carrier means rotatably carrying said rollers for rotation about associated axes of rotation;
said rollers including two rollers spaced such that a reference line intersecting said axes extends at an angle other than 90° relative to the direction of travel of said damper unit;
said carrier means being operably connected to said movable body such that a force is applied to said carrier means in response to motion of said body in said one direction of motion to:
urge said rollers against said guide surfaces at an intensity which progresses in relation to the magnitude of said applied force to resiliently compress said resilient peripheral surface means against said guide surfaces as said rollers rotationally travel therealong, to retard motion of said body.

22. A motion damper comprising:
means providing a pair of opposed guide surfaces;
carrier means;
at least two rollers journalled independently for rotation on said carrier means about parallel axes, said rollers having resilient peripheral surfaces arranged to engage respective ones of said guide surfaces;
actuating means for rotating said carrier means in response to the application of the force generally along the length of said guide surfaces in one direction; said rollers being positioned on said carrier means relative to said guide surfaces such that rotation of said carrier means in response to the application of a force in said one direction urges said peripheral surfaces against said guide surfaces as the rollers travel along said guide surfaces in the direction of said force, and the application of a force in a direction opposite said one direction urges sasid rollers away from said guide surfaces.

23. A motion damper comprising:
means providing a pair of opposed guide surfaces;
carrier means;
at least three rollers journalled independently for rotation on said carrier means about parallel axes, said rollers having resilient peripheral surfaces arranged to engage respective ones of said guide surfaces;
actuating means for rotating said carrier means in response to the application of the force generally along the length of said guide surfaces in opposite directions;
said rollers being positioned on said carrier means relative to said guide surfaces such that rotation of said carrier means in response to the application of a force in one direction urges said peripheral surfaces of a first pair of said rollers against said guide surfaces and the application of a force in a direction opposite said one direction urges said peripheral surfaces of a second pair of said rollers against said guide surfaces.

24. A motion damper comprising:
means providing a pair of spaced guide surfaces;
rigid carrier means;
at least two rollers journalled independently for rotation on said carrier means about parallel axes, said rollers having resilient peripheral surfaces arranged to engage respective ones of said guide surfaces, with said guide surfaces being located between said rollers;
the rollers being arranged such that a reference line intersecting both of said roller axes lies in a non-parallel and non-perpendicular relationship relative to said guide surfaces;

actuating means for rotating said carrier means in response to the application of the force generally along the length of said guide surfaces in one direction;

said rollers being positioned on said carrier means relative to said guide surfaces such that rotation of said carrier means in response to the application of a force in said one direction urges said peripheral surfaces into contact with said guide surfaces at an intensity which progresses in relation to the magnitude of said applied force, to resiliently compress said resilient peripheral surface means against said guide surfaces as said rollers travel along said guide surfaces in the direction of said force.

25. A motion damper comprising:

means providing a pair of spaced guide surfaces defining a runway therebetween;

rigid carrier means;

at least two rollers journalled independently for rotation on said carrier means about parallel axes, said rollers being disposed to travel within said runway and having resilient peripheral surfaces arranged to engage respective ones of said guide surfaces;

the distance separating said opposed guide surfaces being less than the sum of the distance between said roller axes and the radii of two rollers;

the rollers being arranged such that a reference line intersecting both roller axes lies in a non-parallel and non-perpendicular relationship relative to said guide surfaces;

actuating means for rotating said carrier means in response to the application of force generally along the length of said guide surfaces in one direction;

said rollers being positioned on said carrier means relative to said guide surfaces such that rotation of said carrier means in response to the application of a force in said one direction urges said peripheral surfaces into contact with said guide surfaces at an intensity which progresses in relation to the magnitude of said applied force, to resiliently compress said resilient peripheral surface means against said guide surfaces as said rollers travel along said guide surfaces in the direction of said force.

26. A dampening apparatus for retarding motion of a movable body in at least one direction of motion thereof, said dampening apparatus comprising:

means providing a pair of spaced elongated guide surfaces;

a damper unit displaceable along said guide surfaces and including:

at least two rollers having resilient peripheral surfaces arranged to contact respective ones of said guide surfaces, said at least two rollers being free wheeling relative to one another;

carrier means rotatably carrying said at least two rollers, said carrier means being operably connectable to said movable body such that a force is applied to said carrier means in response to motion of said body in said one direction of motion to urge said rollers against said guide surfaces at an intensity which progresses in relation to the magnitude of said applied force to resiliently compress said resilient peripheral surface means against said guide surfaces as said rollers rotationally travel therealong, to retard motion of said body.

* * * * *